US012199456B2

(12) United States Patent
Li (10) Patent No.: US 12,199,456 B2
(45) Date of Patent: Jan. 14, 2025

(54) CHARGING POLICY SETTING METHOD AND APPARATUS

(71) Applicant: CONTEMPORARY AMPEREX TECHNOLOGY (HONG KONG) LIMITED, Hong Kong (CN)

(72) Inventor: Haili Li, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 341 days.

(21) Appl. No.: 17/722,810

(22) Filed: Apr. 18, 2022

(65) Prior Publication Data

US 2022/0352730 A1  Nov. 3, 2022

Related U.S. Application Data

(63) Continuation of application No. PCT/CN2021/091192, filed on Apr. 29, 2021.

(51) Int. Cl.
*H02J 7/00* (2006.01)

(52) U.S. Cl.
CPC ...... *H02J 7/00032* (2020.01); *H02J 7/00309* (2020.01)

(58) Field of Classification Search
USPC ........................................................ 320/118
See application file for complete search history.

(56) References Cited

U.S. PATENT DOCUMENTS 6,700,383 B2    3/2004  Kimura et al.
2002/0195999 A1  12/2002 Kimura et al.
(Continued)

FOREIGN PATENT DOCUMENTS

CN    103414223 A    11/2013
CN    108023130 A     5/2018
(Continued)

OTHER PUBLICATIONS

Notice of Reasons for Refusal dated Oct. 2, 2023 received in Japanese Patent Application No. JP 2021-572919.
(Continued)

*Primary Examiner* — Samuel Berhanu
(74) *Attorney, Agent, or Firm* — Scully, Scott, Murphy & Presser, P.C.

(57) ABSTRACT

The present application provides a charging policy setting method and apparatus, relating to the field of batteries. The method includes, obtaining a plurality of different core working parameters upon charging of a target core under a target charging condition at a target charging rate corresponding to the target charging condition; determining a maximum charging rate corresponding to each charging duration under the target charging condition according to the plurality of different core working parameters; and setting a charging policy under the target charging condition according to each charging duration under the target charging condition and the maximum charging rate corresponding to each charging duration. Thus, when the target core is charged at the set charging policy for each charging duration under the target charging condition, the target core is charged at the maximum charging rate corresponding to the charging duration, ensuring a fast charging speed and a high charging efficiency.

16 Claims, 4 Drawing Sheets

(56) References Cited

U.S. PATENT DOCUMENTS

2016/0359339 A1* 12/2016 Hwang ................ H02J 7/0049
2017/0324092 A1* 11/2017 Yoshida ............... H01M 4/525
2020/0106286 A1    4/2020 Tian
2020/0343735 A1* 10/2020 Aronov ............... H02J 7/0071

FOREIGN PATENT DOCUMENTS

| CN | 110137584 A   | 8/2019 |
| CN | 110828924 A   | 2/2020 |
| CN | 112366375 A   | 2/2021 |
| EP | 3843234 A1    | 6/2021 |
| KR | 20200062672 A | 6/2020 |
| WO | 2021045387 A1 | 3/2021 |

OTHER PUBLICATIONS

Request of the Submission of an Opinion dated Oct. 17, 2023 received in Korean Patent Application No. 10-2021-7040051.
Extended European Search Report dated Dec. 12, 2022 received in European Patent Application No. EP 21859366.3.

\* cited by examiner

CHARGING POLICY SETTING METHOD AND APPARATUS

CROSS-REFERENCE TO RELATED APPLICATIONS

This application is a continuation of International Application No. PCT/CN2021/091192, filed on Apr. 29, 2021, the disclosure of which is hereby incorporated by reference in its entirety.

FIELD OF TECHNOLOGY

The present application relates to the field of batteries and specifically, relates to a charging policy setting method and apparatus.

BACKGROUND

At present, a rechargeable battery has been widely applied to electronic devices of each field (such as an electric vehicle, a mobile phone and a handheld computer etc.), as a power supply source of these electronic devices. When electrical energy stored by the rechargeable battery exhausts, a user can charge the rechargeable battery to facilitate subsequent continuation of these electronic devices. If a charging speed of the rechargeable battery is faster, more time will be saved for the user and the user experience will be better as well. However, if a charging speed of the rechargeable battery is excessively fast, the rechargeable battery is possibly damaged (such as causing lithium plating of a lithium battery). Therefore, how to increase the charging speed of the rechargeable battery as far as possible without causing any damage to the rechargeable battery is a problem to be solved.

SUMMARY

The objective of embodiments of the present application is to provide a charging policy setting method and apparatus for improving the charging speed of the rechargeable battery.

According to a first aspect, embodiments of the present application provide a charging policy setting method, the method including:

obtaining a plurality of different core working parameters upon charging of a target core under a target charging condition at a target charging rate corresponding to the target charging condition; determining a maximum charging rate corresponding to each charging duration under the target charging condition according to the plurality of different core working parameters; and setting a charging policy under the target charging condition according to each charging duration under the target charging condition and the maximum charging rate corresponding to each charging duration.

The charging policy setting method includes firstly obtaining a plurality of different core working parameters upon charging of a target core under a target charging condition at a target charging rate corresponding to the target charging condition; then, determining a maximum charging rate corresponding to each charging duration under the target charging condition according to the plurality of different core working parameters; and setting a charging policy under the target charging condition according to each charging duration under the target charging condition and the maximum charging rate corresponding to each charging duration. Thus, when the target core is charged at the set charging policy under the target charging condition, for each charging duration under the target charging condition, the target core is charged at the maximum charging rate corresponding to the charging duration. That is, the target core is charged at the maximum charging rate by satisfying a condition that an anode potential of the target core is not lower than a preset cutoff anode potential during each charging duration corresponding to the target charging condition. In this way, a fast charging speed and a high charging efficiency are ensured.

In a possible design solution, where the target charging condition includes a target SOC range and the plurality of different core working parameters can include: a preset cutoff anode potential, an anode potential of the target core at a lower limit value of the target SOC range, a current flowing through the target core at the lower limit value of the target SOC range, a changing rate of the target core at an anode potential of a breaking current section of the target SOC range, and a changing slope of the target core with a charging duration at an anode potential of a current stabilizing section corresponding to the target SOC range.

Further, the determining a maximum charging rate corresponding to each charging duration under the target charging condition according to the plurality of different core working parameters can include determining a maximum charging rate corresponding to each charging duration under the target charging condition according to a formula $I_Z=(Q-kt-V[x,y]A)/B+I_X$, where Q is the preset cutoff anode potential, k is the changing slope of the target core with the charging duration at the anode potential of the current stabilizing section corresponding to the target SOC range, t is the charging duration, $V[x,y]A$ is the anode potential of the target core at the lower limit value of the target SOC range, B is the changing rate of the target core at the anode potential of the breaking current section of the target SOC range, $I_X$ is the current flowing through the target core at the lower limit value of the target SOC range and $I_Z$ is the maximum charging rate.

In a possible design solution, before the obtaining the plurality of different core working parameters upon charging of the target core under the target charging condition at the target charging rate corresponding to the target charging condition, the method further includes: obtaining an anode potential upon charging of a target core under the target charging condition respectively at a plurality of different preset charging rates; determining a function relationship of the anode potential under the target charging condition changing with the preset charging rates according to the plurality of different preset charging rates and the anode potential in one-to-one correspondence to the preset charging rates; and determining a charging rate corresponding to a critical value of a set anode potential as the target charging rate according to the function relationship of the anode potential changing with the preset charging rates.

The parameter needing to be obtained is to determine a maximum charging rate corresponding to each charging duration under the target charging condition. Therefore, at the charging rate (i.e. the maximum charging rate under the target charging condition) corresponding to a critical value of an anode potential under the target charging condition, the obtained plurality of different core working parameters are used for determining a higher reliability of the maximum charging rate corresponding to each charging duration under the target charging condition.

Alternatively, in another possible design solution, the target charging rate is pre-configured.

In a possible design solution, after the setting a charging policy under the target charging condition according to each charging duration under the target charging condition and the maximum charging rate corresponding to the each charging duration, the method further includes: charging the target core under the target charging condition according to the charging policy.

According to a second aspect, embodiments of the present application further provide a charging method, the method includes:
  determining a target charging condition of a target core when the target core is in a charging state;
  determining a charging policy according to the target charging condition, where the charging policy includes each charging duration under the target charging condition and a maximum charging rate corresponding to the each charging duration; and
  charging the target core according to the charging policy.

According to a third aspect, the present application further provides a charging policy setting apparatus, the apparatus includes:
  a parameter obtaining unit, configured to obtain a plurality of different core working parameters upon charging of a target core under a target charging condition at a target charging rate corresponding to the target charging condition, where the target charging condition includes a target SOC range;
  a rate determining unit, configured to determine a maximum charging rate corresponding to each charging duration under the target charging condition according to the plurality of different core working parameters, where an anode potential of the target core is not lower than a preset cutoff anode potential when the target core is charged at the maximum charging rate; and
  a policy setting unit, configured to set a charging policy under the target charging condition according to each charging duration under the target charging condition and the maximum charging rate corresponding to the each charging duration.

According to a fourth aspect, the present application further provides a charging apparatus, the apparatus includes:
  a condition determining unit, configured to determine a target charging condition of a target core when the target core is in a charging state;
  a policy determining unit, configured to determine a charging policy according to the target charging condition, where the charging policy includes each charging duration under the target charging condition and a maximum charging rate corresponding to the each charging duration; and
  a charging unit, configured to charge the target core according to the charging policy.

According to a fifth aspect, embodiments of the present application provide an electronic device, includes a processor and a memory, where the memory stores a computer-readable instruction, and when the computer-readable instruction is executed by the processor, steps of the method provided in the first aspect are operated.

According to a sixth aspect, embodiments of the present application provide a readable storage medium storing a computer program thereon, where when the computer program is executed by a processor, steps of the method provided in the first aspect are operated.

BRIEF DESCRIPTION OF THE DRAWINGS

To describe the technical solutions in the embodiments of the present application more clearly, the following briefly describes the accompanying drawings required for describing the embodiments of the present application. It should be understood that the following accompanying drawings merely show some embodiments of the present application and thus should not be regarded as limitation to the scope thereof. A person of ordinary skill in the art may derive other drawings from these accompanying drawings without creative efforts.

DESCRIPTION OF EMBODIMENTS

Interpretations to Professional Terms:

SOC: state of charge (SOC), is a ratio of a residual capacity after a storage battery is used or not used for a period to a capacity of its full-charging stage. A value thereof ranges between 0 and 1. When SOC=0, it means full discharging of the battery and when SOC=1, it means full charging of the battery.

The following clearly and completely describes the technical solutions in the embodiments of the present application with reference to the accompanying drawings in the embodiments of the present application.

At present the fast charging manner for the rechargeable battery involves: determining a cutoff anode potential of each SOC range in a plurality of SOC ranges of a battery, and determining a charging rate according to a cutoff anode potential corresponding to each SOC range. Further, the rechargeable battery can be charged according to the charging rate corresponding to each SOC range. However, the above charging speed for the rechargeable battery is still low.

Figure 1:
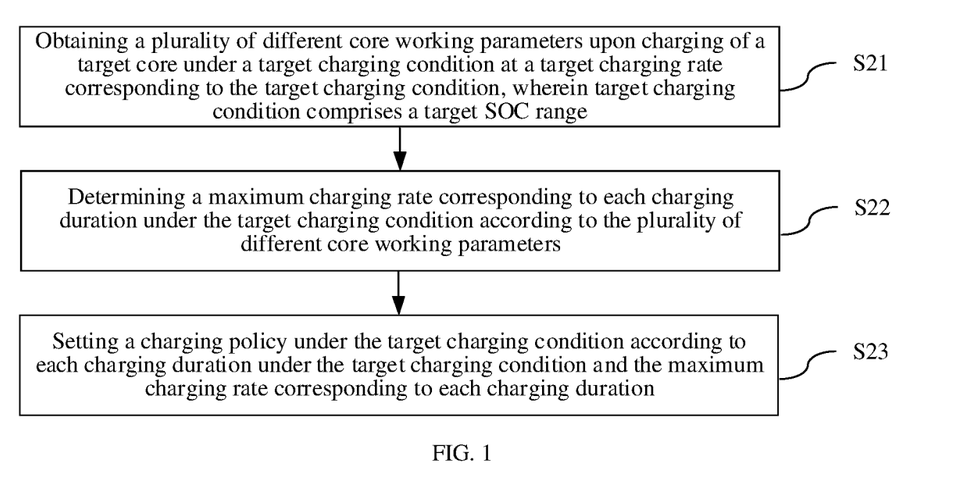
FIG. 1 is a flowchart 1 of a charging policy setting method provided by embodiments of the present application.

Embodiments of the present application provide a charging policy setting method, applied to an electronic device powered with a target core. Where the target core can be, but not limited to an iron phosphate lithium core, a nickel-cobalt-lithium manganese oxide core and other rechargeable cores. Specifically, an electronic device includes a battery management system (BMS) and the display SOC of the target core can be determined to be implemented by the BMS. Where the electronic device can be, but not limited to a smart phone, a tablet PC, an electric automobile and other electronic devices powered with a battery pack. As shown in FIG. 1, the charging policy setting method includes:

S21: obtaining a plurality of different core working parameters upon charging of a target core under a target charging condition at a target charging rate corresponding to the target charging condition;
  where the target charging condition includes a target SOC range. In addition, in some examples, the target charging condition can further include an ambient temperature range, a battery temperature range and the like, which are not limited herein.

In some embodiments, the plurality of core working parameters can include, but not limited to: a changing slope of the target core with a charging duration at an anode potential of a current stabilizing section corresponding to the target SOC range, a charging duration, an anode potential of the target core at a lower limit value of the target SOC range, a changing rate of the target core at an anode potential of a breaking current section of the target SOC range, and a current flowing through the target core at the lower limit value of the target SOC range.

Where, the plurality of core working parameters can be obtained through the following manner:

where the changing slope with a charging duration at an anode potential of a current stabilizing section corresponding to the target SOC range can be obtained according to the following manner obtaining an anode potential of a current stabilizing section corresponding to the target SOC range collected by a voltage collection module and obtaining a charging duration of the target SOC range recorded by a timer; and calculating a changing slope with a charging duration at an anode potential of a current stabilizing section corresponding to the target SOC range according to the anode potential of a current stabilizing section corresponding to the target SOC range and the charging duration of the target SOC range.

The changing slope of the target core with a charging duration at an anode potential of a current stabilizing section corresponding to the target SOC range can be obtained through the following manner obtaining an anode potential of the target core collected by the voltage collection module upon charging the anode potential of the target core to a lower limit value of the target SOC range when a present SOC is at the lower limit value of the target SOC range.

The changing rate of the target core at an anode potential of a breaking current section of the target SOC range can be obtained through the following manner obtaining a current collected by a current collection module and detecting whether the current is in a breaking current section, and if yes, obtaining an anode potential of the target core collected by the voltage collection module. The changing rate of the target core at an anode potential of a breaking current section of the target SOC range can be calculated according to the charging duration and the anode potential.

The current flowing through the target core at a lower limit value of the target SOC range can be obtained through the following manner the current flowing through the target core collected by the current collection module can be obtained when the present SOC is at the lower limit value of the target SOC range.

In some embodiments, under different target charging conditions, values of the plurality of different core working parameters are different. It is assumed that the target charging condition includes a different SOC range and a different ambient temperature range, and values for the anode potential of the target core at a lower limit value of the target SOC range, for the changing slope of the target core with a charging duration at an anode potential of a current stabilizing section corresponding to the target SOC range and for the changing rate of the target core at an anode potential of a breaking current section of the target SOC range can be represented respectively in the following Table 1 to Table 3 under the different SOC range and the different ambient temperature range.

TABLE 1

| SOC range | ambient temperature range | | | |
|---|---|---|---|---|
| | $[T_1, T_2]$ | $[T_2, T_3]$ | ... | $[T_{n-1}, T_n]$ |
| [SOC1, SOC2] | $V_{1,1}$ | $V_{1,2}$ | ... | $V_{1,n-1}$ |
| ... | ... | ... | ... | ... |
| [SOC (n − 1), SOC (n − 2)] | $V_{n-1,n}$ | $V_{n-1,2}$ | ... | $V_{n-1,n-1}$ |

It can be understood that in Table 1, T is an ambient temperature and V is an anode potential of the target core at the lower limit value of the target SOC range.

TABLE 2

| SOC range | ambient temperature range | | | |
|---|---|---|---|---|
| | $[T_1, T_2]$ | $[T_2, T_3]$ | ... | $[T_n, T_{n-1}]$ |
| [SOC1, SOC2] | $K_{1,1}$ | $K_{1,2}$ | ... | $K_{1,n-1}$ |
| ... | ... | ... | ... | ... |
| [SOC (n − 1), SOC(n − 2)] | $K_{n-1,1}$ | $K_{n-1,2}$ | ... | $K_{n-1,n-1}$ |

It can be understood that in Table 2, T is an ambient temperature and K is a changing slope of the target core with a charging duration at an anode potential of a current stabilizing section corresponding to the target SOC range.

TABLE 3

| SOC range | temperature | | | |
|---|---|---|---|---|
| | $[T_1, T_2]$ | $[T_2, T_3]$ | ... | $[T_n, T_{n-1}]$ |
| [SOC1, SOC2] | $B_{1,1}$ | $B_{1,2}$ | ... | $B_{1,n-1}$ |
| ... | ... | ... | ... | ... |
| [SOC (n − 1), SOC (n − 2)] | $B_{n-1,1}$ | $B_{n-1,2}$ | ... | $B_{n-1,n-1}$ |

It can be understood that in Table 3, T is an ambient temperature and B is a changing rate of the target core at an anode potential of a breaking current section of the target SOC range.

S22: determining a maximum charging rate corresponding to each charging duration under the target charging condition according to the plurality of different core working parameters.

The plurality of different core working parameters are determined upon charging at the target charging rate corresponding to the target charging condition. Therefore, the plurality of different core working parameters can be used as the reference factors for determining a maximum charging rate corresponding to each charging duration under the target charging condition.

It can be understood that when the target charging condition includes a plurality of charging durations, a plurality of maximum charging rates in one-to-one correspondence to the plurality of charging durations can be determined. For example, when the target charging condition includes the target SOC range [SOC1, SOC2] and the target temperature range $[T_1, T_2]$, the plurality of the charging durations under the target temperature range $[T_1, T_2]$ and the target SOC range [SOC1, SOC2] include moments t1-t10. In this way, the maximum charging rate M1 can be determined at moment t1 and the maximum charging rate M2 is determined at moment t2, and so on, which are not limited herein. For example again, when the target charging condition includes the target SOC range [SOC2, SOC3] and the target temperature range $[T_1, T_2]$, the plurality of the charging durations under the target temperature range $[T_1, T_2]$ and the target SOC range [SOC2, SOC3] include moments t11420. In this way, the maximum charging rate M11 can be determined at moment t11 and the maximum charging rate M12 is determined at moment t12, and so on, which are not limited herein.

Where an anode potential of the target core under each charging duration is not lower than a preset cutoff anode potential when the target core is charged at the maximum charging rate. It can be understood that if an anode potential of the target core is lower than a preset cutoff anode potential, the target core will be damaged (if the target core is a core of a lithium battery, lithium plating of the core will be caused). Therefore, in a charging process, the anode potential of the target core is made not to be lower than the upper limit value of the charging rate of the preset cutoff anode potential, i.e. the maximum charging rate.

It should be noted that the above target charging rate can be the maximum charging rate corresponding to the target charging condition. Where an anode potential of the target core is not lower than a preset cutoff anode potential for each charging duration corresponding to the target charging condition when the target core is charged at the maximum charging rate corresponding to the target charging condition.

S23: setting a charging policy under the target charging condition according to each charging duration under the target charging condition and the maximum charging rate corresponding to the each charging duration.

Based on the example in S22, the charging policy set under the target charging condition can be: when the target charging condition includes the target SOC range [SOC1, SOC2] and the target temperature range [$T_1$, $T_2$], setting charging at the maximum charging rate M1 during moment t1, charging at the maximum charging rate M2 during moment t2 charging at the maximum charging rate M10 during moment t10; and when the target charging condition includes the target SOC range [SOC2, SOC3] and the target temperature range [$T_1$, $T_2$], setting charging at the maximum charging rate M11 during moment t11, charging at the maximum charging rate M12 during moment t12 charging at the maximum charging rate M20 during moment t20.

After determining the charging policy, the target core under the target charging condition can be immediately charged according to the determined charging policy, thereby realizing real time determination of a charging policy and real time charging.

The charging policy setting method includes firstly obtaining the plurality of different core working parameters upon charging of the target core under the target charging condition at the target charging rate corresponding to the target charging condition; then, determining a maximum charging rate corresponding to each charging duration under the target charging condition according to the plurality of different core working parameters; and setting a charging policy under the target charging condition according to each charging duration under the target charging condition and the maximum charging rate corresponding to each charging duration. Thus, when the target core is charged at the set charging policy under the target charging condition, for each charging duration under the target charging condition, the target core is charged at the maximum charging rate corresponding to the charging duration. That is, the target core is charged at the maximum charging rate by satisfying a condition that an anode potential of the target core is not lower than a preset cutoff anode potential during each charging duration corresponding to the target charging condition. In this way, a fast charging speed and a high charging efficiency are ensured.

In some embodiments, when the plurality of core working parameters include: a changing slope of the target core with a charging duration at an anode potential of a current stabilizing section corresponding to the target SOC range, a charging duration, an anode potential of the target core at a lower limit value of the target SOC range, a changing rate of the target core at an anode potential of a breaking current section of the target SOC range, a current flowing through the target core at a lower limit value of the target SOC range and the maximum charging rate, the above S22 can specifically be implemented according to the following manner determining a maximum charging rate corresponding to each charging duration under the target charging condition according to a formula $I_Z = (Q - kt - V_{[x,y]A})/B + I_X$.

Where Q is the preset cutoff anode potential, k is the changing slope of the target core with the charging duration at the anode potential of the current stabilizing section corresponding to the target SOC range, t is the charging duration, V[x,y]A is the anode potential of the target core at the lower limit value of the target SOC range, B is the changing rate of the target core at the anode potential of the breaking current section of the target SOC range, IX is the current flowing through the target core at the lower limit value of the target SOC range and IZ is the maximum charging rate.

Figure 2:
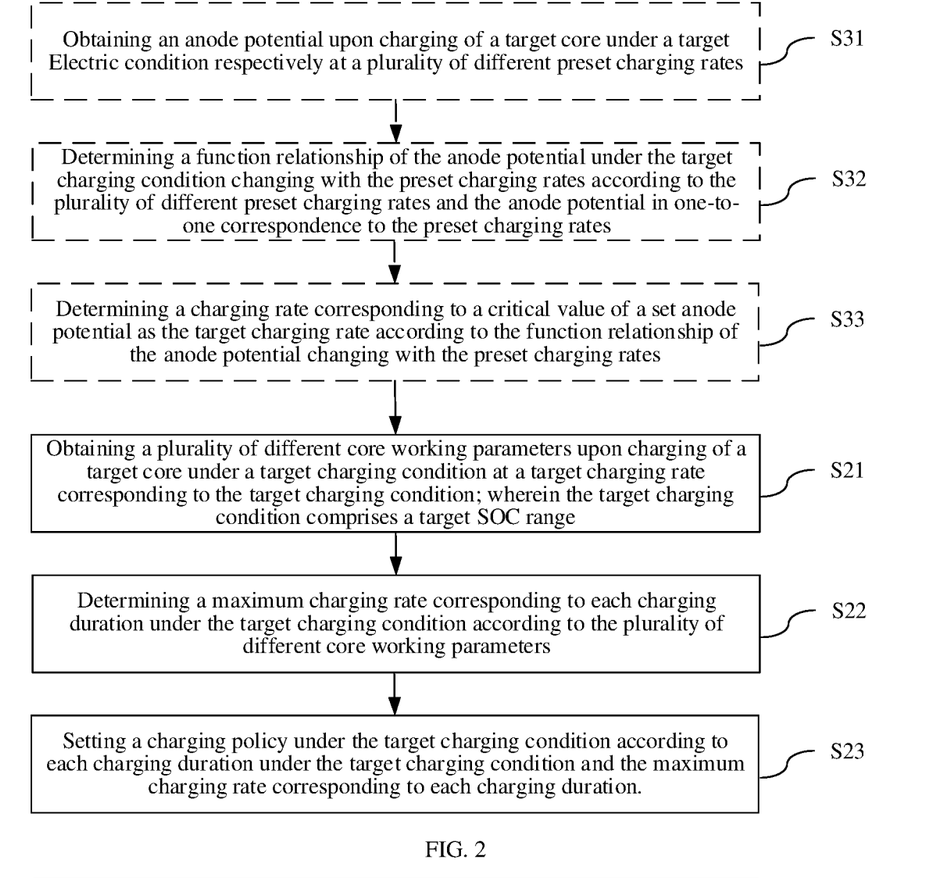
FIG. 2 is a flowchart 2 of a charging policy setting method provided by embodiments of the present application.

In some embodiments, the manner for determining the target charging rate can include, but not limited to the following two manners:

No. 1 manner as shown in FIG. 2, the following steps can be employed before S21 to determine the target charging rate.

S31: obtaining an anode potential upon charging of a target core under a target charging condition respectively at a plurality of different preset charging rates.

It can be understood that the preset charging rate of a different value corresponds to an anode potential of a different value. It is assumed that a plurality of different preset charging rates include C[1, 1], C[1, 2], C[1, n−1], the target core is charged at the preset charging rate C[1, 1] to obtain an anode potential A[1, 1]; the target core is charged at the preset charging rate C[1, 2] to obtain an anode potential A[1, 2]; and the target core is charged at the preset charging rate C[1, n−1] to obtain an anode potential A[1, n−1]. It can be seen that C[1, 1] has a corresponding relationship with A[1, 1], C[1, 2] has a corresponding relationship with A[1, 2] and C[1, n−1] has a corresponding relationship with A[1, n−1].

As shown in the following Table 4, Table 4 shows a corresponding relationship of a value of a preset charging rate to a value of an anode potential under a different target charging condition.

TABLE 4

| SOC range/ temperature range | Preset charging rate C/anode potential A | | |
|---|---|---|---|
| [SOC1, SOC2]/[$T_1$-$T_2$] | C[1, 1] | C[1, 2] | ... C[1, n − 1] |
| | A[1, 1] | A[1, 2] | ... A[1, n − 1] |
| [SOC3, SOC4]/[$T_2$-$T_3$] | C[2, 1] | C[2, 2] | ... C[2, n − 1] |
| | A[2, 1] | A[2, 2] | ... A[2, n − 1] |
| ... | ... | ... | ... |
| [SOC(n − 2), SOC(n − 2)]/[$T_1$-$T_2$] | C[n − 2, 1] | C[n − 2, 2] | ... C[n − 2, n − 1] |
| | A[n − 2, 1] | A[n − 2, 2] | ... A[n − 2, n − 1] |
| [SOC(n − 1), SOC(n − 2)]/[$T_{n-1}$-$T_n$] | C[n − 1, 1] | C[n − 1, 2] | ... C[n − 1, n − 1] |
| | A[n − 1, 1] | A[n − 1, 2] | ... A[n − 1, n − 1] |

S32: determining a function relationship of the anode potential under the target charging condition changing with the preset charging rates according to the plurality of different preset charging rates and the anode potential in one-to-one correspondence to the preset charging rates.

When the target charging condition includes the target SOC range [SOC1, SOC2] and the target temperature range [$T_1$, $T_2$], based on S31, C[1, 1] has a corresponding relationship with A[1, 1], C[1, 2] has a corresponding relationship with A[1, 2] and C[1, n−1] has a corresponding relationship with A[1, n−1]. Further, {C[1, 1], A[1, 1]}, {C[1, 2], A[1, 2]}, {C[1, n−1] and A[1, n−1]} can be fit to obtain a fitting straight line, where the fitting straight line can represent a function relationship of the anode potential under the target charging condition changing with the preset charging rates.

S33: determining a charging rate corresponding to a critical value of a set anode potential as the target charging rate according to the function relationship of the anode potential changing with the preset charging rates.

Where when the critical value of the set anode potential is the lowest anode potential at which the target core is not damaged under the target charging condition. The set anode potential can be brought into the function relationship of the anode potential under the target charging condition changing with the preset charging rates to obtain a target charging rate. It can be understood that the target charging rate determined at this time is the maximum charging rate at which the target core is not damaged under the target charging condition.

It can be understood that in embodiments of the present application, the parameter finally needing to be obtained is to determine a maximum charging rate corresponding to each charging duration under the target charging condition. Therefore, at the charging rate (i.e. the maximum charging rate under the target charging condition) corresponding to a critical value of an anode potential under the target charging condition, the obtained plurality of different core working parameters are used for determining a higher reliability of the maximum charging rate corresponding to each charging duration under the target charging condition.

In some other embodiments, the target charging rate can also be pre-configured by a manufacturer according to actual requirements. For example, the configured target charging rate is smaller than the maximum charging rate under the target charging condition and a difference value between the configured target charging rate and the maximum charging rate is smaller than a preset threshold. It can be understood that the probability of causing a damage to the target core upon being charged becomes small when the configured target charging rate is smaller than the maximum charging rate under the target charging condition. In addition, the obtained plurality of different core working parameters can be used for determining a higher reliability of the maximum charging rate corresponding to each charging duration under the target charging condition when the difference value between the configured target charging rate and the maximum charging rate is smaller than the preset threshold.

Figure 3:
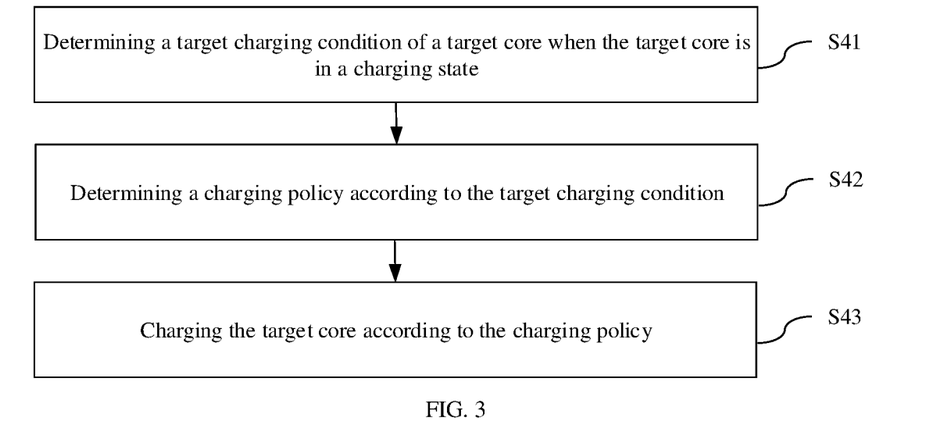
FIG. 3 is a flowchart of a charging method provided by embodiments of the present application.

Please referring to FIG. 3, embodiments of the present application further provide a charging method, also applied to an electronic device powered with a target core. Where the electronic device can be, but not limited to a smart phone, a tablet PC, an electric automobile and other electronic devices powered with a battery pack. When the electronic device is in a working state, a display interface of the electronic device is lighted on and the display interface includes an icon for indicating display SOC. As shown in FIG. 3, the method includes:

S41: determining a target charging condition of a target core when the target core is in a charging state.

For example, when the target charging condition includes a different SOC range and a different ambient temperature range, an ambient temperature around the target core and the SOC of the target core are detected. Further, the target charging condition of the target core is determined. Specifically, the ambient temperature around the target core can be collected through a temperature sensor, and parameters like a present temperature, working conditions, and an available electric quantity range of the target core are collected. The SOC of the target core is calculated according to the temperature, working conditions, and the available electric quantity range of the target core.

S42: determining a charging policy according to the target charging condition.

Specifically, one-to-one correspondence relationship between the target charging condition and the charging policy is pre-stored. The charging policy can be found according to the target charging condition after determining the target charging condition of the target core.

Where the charging policy includes each charging duration under the target charging condition and a maximum charging rate corresponding to each charging duration. The maximum charging rate corresponding to each charging duration under the target charging condition is determined according to the plurality of different core working parameters. Regarding the specific manner for determination, reference can be made to the introduction of S21 to S22 in the above embodiments, which is not described in details any longer herein.

S43: charging the target core according to the charging policy.

The specific charging manner can involve charging the target core at the maximum charging rate corresponding to the charging duration for each charging duration under the target charging condition. That is, the target core is charged at the maximum charging rate by satisfying a condition that the anode potential of the target core is not lower than the preset cutoff anode potential during each charging duration corresponding to the target charging condition. In this way, a fast charging speed and a high charging efficiency are ensured.

Figure 4:
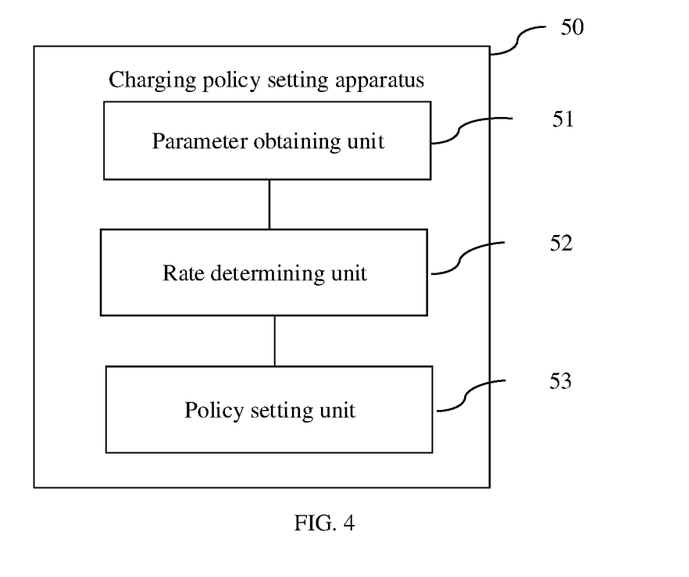
FIG. 4 is a block diagram of a functional module of a charging policy setting apparatus provided by embodiments of the present application.

Please referring to FIG. 4, the present application further provides a charging policy setting apparatus 50, applied to an electronic device powered with a target core. Specifically, the electronic device includes a battery management system (BMS) and the method for determining display SOC of the battery pack can be specifically applied to the BMS. Where the electronic device can be, but not limited to a smart phone, a tablet PC, an electric automobile and other electronic devices powered with a battery pack. It should be noted that regarding the charging policy setting apparatus 50 of the battery pack provided by embodiments of the present application, the basic principles thereof and the technical effects produced thereby are the same as those of the above embodiments. For concise descriptions, reference can be made to the corresponding contents in the above embodiments for a part which is not mentioned in the embodiment. The apparatus 50 includes a parameter obtaining unit 51, a rate determining unit 52, and a policy setting unit 53, where the parameter obtaining unit 51 is used for obtaining a plurality of different core working parameters upon charging of a target core under a target charging condition at a target charging rate corresponding to the target charging condition, where the target charging condition includes a target SOC range.

Where the plurality of different core working parameters can include, but not limited to: a preset cutoff anode potential, an anode potential of the target core at a lower limit value of the target SOC range, a current flowing through the target core at a lower limit value of the target SOC range, a changing rate of the target core at an anode potential of a breaking current section of the target SOC range, and a changing slope of the target core with a charging duration at an anode potential of a current stabilizing section corresponding to the target SOC range.

The rate determining unit 52 is used for determining a maximum charging rate corresponding to each charging duration under the target charging condition according to the plurality of different core working parameters, where an anode potential of the target core is not lower than a preset cutoff anode potential when the target core is charged at the maximum charging rate.

In an alternative implementation, the rate determining unit 52 can be specifically used for determining a maximum charging rate corresponding to each charging duration under the target charging condition according to the formula $I_Z=(Q-kt-V[x, y]A)/B+I_X$. Where Q is a preset cutoff anode potential, k is a changing slope of the target core with a charging duration at an anode potential of a current stabilizing section corresponding to the target SOC range, t is a charging duration, V[x,y]A is an anode potential of the target core at a lower limit value of the target SOC range, B is a changing rate of the target core at an anode potential of a breaking current section of the target SOC range, IX is a current flowing through the target core at a lower limit value of the target SOC range and IZ is a maximum charging rate.

The policy setting unit 53 is used for setting a charging policy under the target charging condition according to each charging duration under the target charging condition and the maximum charging rate corresponding to each charging duration.

In some embodiments, determining the target charging rate can be implemented through the following unit:
the parameter obtaining unit 51 is further used for obtaining an anode potential upon charging of a target core under a target charging condition respectively at a plurality of different preset charging rates.

The apparatus 50 can further include: a function relationship determining unit for determining a function relationship of the anode potential under the target charging condition changing with the preset charging rates according to the plurality of different preset charging rates and the anode potential in one-to-one correspondence to the preset charging rates.

The rate determining unit 53 is further used for determining a charging rate corresponding to a critical value of a set anode potential as the target charging rate according to the function relationship of the anode potential changing with the preset charging rates.

In some other embodiments, the target charging rate is pre-configured.

In some embodiments, the apparatus 50 can further include:
a charging unit for charging the target core under the target charging condition according to the charging policy.

Figure 5:
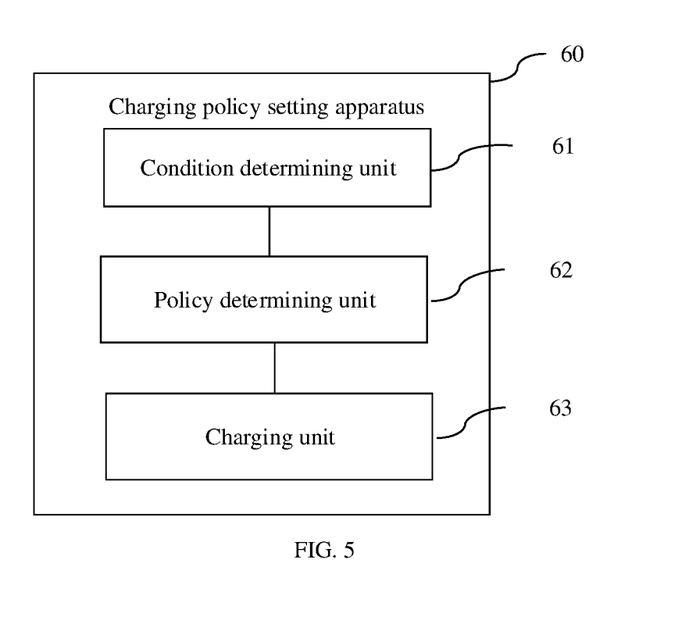
FIG. 5 is a block diagram of a functional module of a charging apparatus provided by embodiments of the present application.

Please referring to FIG. 5, the present application further provides a charging apparatus 60, applied to an electronic device powered with a target core. Specifically, the electronic device includes a battery management system (BMS) and the method for determining display SOC of the battery pack can be specifically applied to the BMS. Where the electronic device can be, but not limited to a smart phone, a tablet PC, an electric automobile and other electronic devices powered with a battery pack. The apparatus 60 includes a condition determining unit 61, a policy determining unit 62 and a charging unit 63, where
the condition determining unit 61 is used for determining a target charging condition of a target core when the target core is in a charging state;
the policy determining unit 62 is used for determining a charging policy according to the target charging condition;
Where the charging policy includes each charging duration under the target charging condition and a maximum charging rate corresponding to each charging duration.
the charging unit 63 is used for charging the target core according to the charging policy.

The defects existing in the solutions of the prior art are the results obtained by practice and careful study of the applicant. Therefore, the discovery process of the above problem and the solutions proposed for the above problem in embodiments of the present application in the following text should be the contributions made by the applicant to the present application in a process of the present application.

Figure 6:
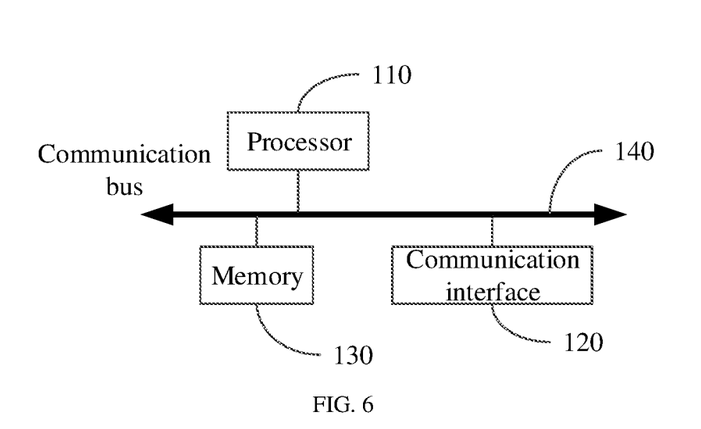
FIG. 6 is a structural block diagram of an electronic device provided by embodiments of the present application.

Please referring to FIG. 6, FIG. 6 is a structural diagram of an electronic device for performing a charging policy setting method or a charging method provided by embodiments of the present application. The electronic device can include at least one processor 110 such as a CPU, at least one communication interface 120, at least one memory 130 and at least one communications bus 140. Where, the communication bus 140 is used for implementing a direct connection communication between these components. Where, the communication interface 120 of the device in embodiments of the present application is used for performing signaling or data communication with another node device. The memory 130 can be a high-speed RAM memory, or can also be a non-volatile memory (non-volatile memory), for example, at least one magnetic disk memory. Optionally, the memory 130 can also be at least one storage apparatus located far away from the processor. The memory 130 stores a computer-readable instruction, and when the computer-readable instruction is executed by the processor 110, the electronic device performs the process of the method shown in FIG. 2 and FIG. 4.

It can be understood that the structure shown in FIG. 6 is only illustrative and the electronic device can further include more or less components shown in FIG. 6 or have a different configuration shown in FIG. 6. Each component shown in FIG. 6 can be implemented with a hardware, a software or a combination thereof.

The apparatus can be a module, a program section or a code on the electronic device. It should be understood that the apparatus corresponds to the method embodiment in FIG. 2 and FIG. 4 and is capable of performing each step involved in the method embodiment in FIG. 2 and FIG. 4. Regarding specific functions of the apparatus, reference can be made to descriptions in the previous text. In order to avoid repetition, detailed descriptions are omitted herein.

It should be noted that a person skilled in the art can clearly understand that for convenient and concise descriptions, reference can be made to a corresponding process in the method embodiment regarding the specific working process of the system and apparatus described above. Thus, this is not repeatedly described herein.

Embodiments of the present application provide a readable storage medium storing a computer program thereon, and when the computer program is executed by a processor, the process of the method performed by the electronic device in the method embodiment shown in FIG. 2 and FIG. 4 is performed.

The embodiment discloses a computer program product, the computer program product includes a computer program stored on a non-transient computer-readable storage medium. The computer program includes a program instruction, where when the program instruction is performed by a computer, the computer is capable of performing the method provided in the above method embodiments. For example, obtaining a plurality of different core working parameters upon charging of a target core under a target charging condition at a target charging rate corresponding to the target charging condition, where the target charging condition includes a target SOC range; determining a maximum charging rate corresponding to each charging duration under the target charging condition according to the plurality of different core working parameters, where an anode potential of the target core is not lower than a preset cutoff anode potential when the target core is charged at the maximum charging rate; and setting a charging policy under the target charging condition according to each charging duration under the target charging condition and the maximum charging rate corresponding to each charging duration, can be performed.

In the embodiments provided in the present application, it should be understood that the disclosed apparatus and method may be implemented in other manners. The described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electronic, mechanical, or other forms.

In addition, the units described as separate parts may or may not be physically separated, and the parts displayed as units may or may not be physical units, i.e. may be located in one position, or may be distributed on a plurality of network units. Some or all of the units may be selected based on actual requirements to achieve the objectives of the solutions of the embodiments.

In addition, functional modules in the embodiments of the present application may be integrated together to form an independent part, or each of the modules may exist alone, or two or more modules are integrated to form an independent part.

In this description, relational terms such as first and second are only used to distinguish one entity or operation from another, and do not necessarily require or imply that any actual relationship or sequence exists between these entities or operations.

The foregoing descriptions are merely better embodiments of the present application, but are not intended to limit the protection scope of the present application. A person skilled in the art understands that the present application may have various modifications and variations. Any modification, equivalent replacement, and improvement made within the spirit and principle of the present application fall within the protection scope of the present application.

What is claimed is:

1. A charging policy setting method, comprising:
    obtaining a plurality of different core working parameters upon charging of a target core under a target charging condition at a target charging rate corresponding to the target charging condition;
    determining a maximum charging rate corresponding to each charging duration under the target charging condition according to the plurality of different core working parameters; and
    setting a charging policy under the target charging condition according to each charging duration under the target charging condition and the maximum charging rate corresponding to each charging duration;
    wherein an anode potential of the target core is not lower than a preset cutoff anode potential when the target core is charged at the maximum charging rate.

2. The method according to claim 1, wherein the target charging condition comprises a target state of charge (SOC) range, and the plurality of different core working parameters comprise: the preset cutoff anode potential, the anode potential of the target core at a lower limit value of the target SOC range, a current flowing through the target core at the lower limit value of the target SOC range, a changing rate of the target core at the anode potential of a breaking current section of the target SOC range, and a changing slope of the target core with a charging duration at the anode potential of a current stabilizing section corresponding to the target SOC range.

3. The method according to claim 2, wherein the determining a maximum charging rate corresponding to each charging duration under the target charging condition according to the plurality of different core working parameters, comprises:
    determining a maximum charging rate corresponding to each charging duration under the target charging condition according to a formula $IZ=(Q-kt-V[x,y]A)/B+IX$, wherein Q is the preset cutoff anode potential, k is the changing slope of the target core with the charging duration at the anode potential of the current stabilizing section corresponding to the target SOC range, t is the charging duration, V[x,y] A is the anode potential of the target core at the lower limit value of the target SOC range, B is the changing rate of the target core at the anode potential of the breaking current section of the target SOC range, IX is the current flowing through the target core at the lower limit value of the target SOC range and IZ is the maximum charging rate.

4. The method according to claim 1, wherein before the obtaining the plurality of different core working parameters upon charging of the target core under the target charging condition at the target charging rate corresponding to the target charging condition, the method further comprises:
    obtaining the anode potential upon charging of a target core under the target charging condition respectively at a plurality of different preset charging rates;
    determining a function relationship of the anode potential under the target charging condition changing with the preset charging rates according to the plurality of different preset charging rates and the anode potential in one-to-one correspondence to the preset charging rates; and
    determining a charging rate corresponding to a critical value of a set anode potential as the target charging rate according to the function relationship of the anode potential changing with the preset charging rates.

5. The method according to claim 1, wherein the target charging rate is pre-configured.

6. The method according to claim 1, wherein after the setting a charging policy under the target charging condition according to each charging duration under the target charging condition and the maximum charging rate corresponding to the each charging duration, the method further comprises:
charging the target core under the target charging condition according to the charging policy.

7. A storage medium storing a computer program thereon, wherein when the computer program is executed by a processor, the method of claim 1 is operated.

8. A charging method, wherein the method comprises:
determining a target charging condition of a target core when the target core is in a charging state;
determining a charging policy according to the target charging condition, wherein the charging policy comprises: each charging duration under the target charging condition and a maximum charging rate corresponding to the each charging duration; and
charging the target core according to the charging policy, wherein an anode potential of the target core is not lower than a preset cutoff anode potential when the target core is charged at the maximum charging rate.

9. An electronic device, characterized by comprising a processor and a memory, wherein the memory stores a computer-readable instruction, and when the computer-readable instruction is executed by the processor, the method of claim 8 is operated.

10. A storage medium storing a computer program thereon, wherein when the computer program is executed by a processor, the method of claim 8 is operated.

11. An electronic device, characterized by comprising a processor and a memory, wherein the memory stores a computer-readable instruction, and when the computer-readable instruction is executed by the processor, the processor is configured to:
obtain a plurality of different core working parameters upon charging of a target core under a target charging condition at a target charging rate corresponding to the target charging condition;
determine a maximum charging rate corresponding to each charging duration under the target charging condition according to the plurality of different core working parameters; and
set a charging policy under the target charging condition according to each charging duration under the target charging condition and the maximum charging rate corresponding to each charging duration, wherein an anode potential of the target core is not lower than a preset cutoff anode potential when the target core is charged at the maximum charging rate.

12. The electronic device according to claim 11, wherein the target charging condition comprises a target state of charge (SOC) range, and the plurality of different core working parameters comprise: the preset cutoff anode potential, the anode potential of the target core at a lower limit value of the target SOC range, a current flowing through the target core at the lower limit value of the target SOC range, a changing rate of the target core at the anode potential of a breaking current section of the target SOC range, and a changing slope of the target core with a charging duration at the anode potential of a current stabilizing section corresponding to the target SOC range.

13. The electronic device according to claim 12, wherein the processor is configured to:
determine a maximum charging rate corresponding to each charging duration under the target charging condition according to a formula $IZ=(Q-kt-V[x,y]A)/B+IX$, wherein Q is the preset cutoff anode potential, k is the changing slope of the target core with the charging duration at the anode potential of the current stabilizing section corresponding to the target SOC range, t is the charging duration, $V[x,y]A$ is the anode potential of the target core at the lower limit value of the target SOC range, B is the changing rate of the target core at the anode potential of the breaking current section of the target SOC range, IX is the current flowing through the target core at the lower limit value of the target SOC range and IZ is the maximum charging rate.

14. The electronic device according to claim 11, wherein the processor is configured to:
obtain an anode potential upon charging of a target core under the target charging condition respectively at a plurality of different preset charging rates;
determine a function relationship of the anode potential under the target charging condition changing with the preset charging rates according to the plurality of different preset charging rates and the anode potential in one-to-one correspondence to the preset charging rates; and
determine a charging rate corresponding to a critical value of a set anode potential as the target charging rate according to the function relationship of the anode potential changing with the preset charging rates.

15. The electronic device according to claim 11, wherein the target charging rate is pre-configured.

16. The electronic device according to claim 11, wherein the processor is configured to:
charge the target core under the target charging condition according to the charging policy.

* * * * *